United States Patent [19]

Moody

[11] Patent Number: 5,690,142
[45] Date of Patent: Nov. 25, 1997

[54] VARIABLE ORIFICE BALL VALUE

[75] Inventor: Paul E. Moody, Barrington, R.I.

[73] Assignee: The United States of America as represented by the Secretary of the Navy, Washington, D.C.

[21] Appl. No.: 700,746

[22] Filed: Jul. 30, 1996

[51] Int. Cl.⁶ ........................................................ F16K 5/10
[52] U.S. Cl. ........................................ 137/614.17; 251/121
[58] Field of Search ................................ 251/61.1, 121, 251/298, 304, 315.16; 137/614.17, 614.18

[56] References Cited

U.S. PATENT DOCUMENTS 4,111,229  9/1978  Christian ............................ 137/614.17

*Primary Examiner*—John Fox
*Attorney, Agent, or Firm*—Michael J. McGowan; James M. Kasischke; Prithvi C. Lall

[57] ABSTRACT

A variable orifice ball valve includes an external housing with a longitudinal fluid bore formed therethrough. A ball member is rotatably positioned within the external housing. The ball member can include first and second ball portions, with the longitudinal fluid bore formed through the ball member and a pressure port formed through the ball member. An elastically expansible sleeve member is secured to an inner wall of the ball member, the elastically expansible sleeve member including opposing end portions and a middle section. The end portions are secured to an inner wall of the ball member, the elastically expansible sleeve member defining an expansible chamber between the inner wall of the ball member and the elastically expansible sleeve member, such that a variable sized fluid port is formed on the inner surface of the elastically expansible sleeve member for restricting fluid flow by expanding the sleeve member upon introduction of a pressurized fluid through the fluid bore and pressure port.

19 Claims, 4 Drawing Sheets

VARIABLE ORIFICE BALL VALUE

STATEMENT OF GOVERNMENT INTEREST

The invention described herein may be manufactured and used by, or for, the Government of the United States of America for governmental purposes without the payment of any royalties thereon or therefor.

BACKGROUND OF THE INVENTION

(1) Field of the Invention

This invention generally relates to a variable orifice ball valve, and more particularly to a variable orifice ball valve in which an elastically expansible sleeve member is housed therein, the elastically expansible sleeve member being internally deformable by a predetermined type of pressure in order to selectively constrict a sleeve opening through which fluids pass.

(2) Description of the Prior Art

Existing flow restrictors are normally fixed in size and configuration. However, a partially open valve can also act as a flow restrictor. The problem with using a valve as a flow restrictor is that the partially open valve introduces a high resistance coefficient to the piping system which results in turbulent flow of the fluid passing through the valve. This turbulent flow can result in unacceptable structural vibrations in the system which results in high system noise. Even for valves which are fully opened, this can be a problem as a laminar flow path of a fluid passing through a valve can be easily disturbed.

One valve which minimizes disturbance to the flow path is a ball valve. A typical prior art ball valve is shown in FIG. 1 of the drawings. With this typical ball valve, when the ball 108 is rotated 90°, a flow path 110 is provided which ports fluid directly through the valve with no turns. The only flow disturbance created in this type of valve is where a fluid flow 114 passes over a seal area 112 of the valve 100. However, if this type of valve is used as a flow restrictor, when partially opened, it introduces sharp edges to the flow path which can result in a turbulent flow.

FIG. 2 reflects a ball valve 200 which was developed to eliminate the above problem occurring in the ball valve 100 of the type shown in FIG. 1. The configuration shown in FIG. 2 is such that the ball 202 has an ever increasing and then decreasing spiral groove cut 204 into the ball 202. The ball 202 is rotated in an angle which is not perpendicular to the flow path 206. When the ball 202 is rotated from its fully closed position, it first opens a small slot for fluid flow. This small opening eliminates the water hammer effect which can be present in a standard ball valve 100 that opens to a connecting pipe line which has a different system pressure. Additionally, if the valve rotates less than a required full 270° of throw, it will act as a flow restrictor.

The difficulty found with the standard ball valve shown in FIG. 1 is that it can easily cause a water hammer effect if opened rapidly, and it introduces sharp edges to the flow path which can cause cavitation if the valve is only partially opened when acting as a flow restrictor. The difficulty found with the variable orifice ball valve shown in FIG. 2 is that it is very expensive to machine the variable slot into the ball and the requirement for the 270° of rotation results in the need for a large and expensive rotary actuator.

Known variable orifice ball valves include the following:

U.S. Pat. No. 4,267,853 to Yamaguchi et al. discloses a tube of expansible material defining a passage for gas. When heated, the tube expands to slowly close the passage.

U.S. Pat. No. 4,271,866 to Bey discloses the reduction of excessive vibrations and valve noise in a drag ball valve by regulating the pressure drop therethrough. The fluid flow is interrupted using fixed discs and rotating discs, each of which has apertures that are aligned/misaligned to adjust fluid flow.

U.S. Pat. No. 4,358,085 to Regan et al. discloses a blowout prevention apparatus having a radially compressible annular packing mounted within a housing chamber. An outer tubular packing is pressurized by hydraulic fluid through a passage to apply a radially constricting force around the annular package.

U.S. Pat. No. 5,167,283 to Smith et al. discloses elastomeric pipe sealing assemblies located inside of a ball element. Hydraulic fluid pressure is applied annularly via a passage to element which causes element to seal around the pipe. The ball element can be rotated 90° if the pipe sealing element is leaking.

U.S. Pat. No. 5,207,409 to Riikonen discloses a pinch valve system with a valve body having a longitudinal dimension substantially identical to a standard ball valve so as to be insertable therein. A flexible-walled tubular sleeve is pinched radially by actuation of valve closing members.

U.S. Pat. No. 5,211,370 to Powers discloses a variable orifice sealing valve made from an elastic cylinder constrained at both ends. One end is twisted with respect to the other end to reduce the fluid flow path.

The above devices are complicated in structure and tend to be difficult to use and are therefore substantially unacceptable to provide a low cost ball valve that introduces a wide range of flow restrictions into a piping system without introducing large resistance coefficients associated with sharp entrance or exit coefficients.

SUMMARY OF THE INVENTION

Therefore, it is an object of this invention to provide a variable orifice ball valve which solves the problems found in the above prior art.

Specifically, it is an object of this invention to provide a variable orifice ball valve which is low in cost and mechanically simple in structure.

It is another object of this invention to provide a variable orifice ball valve which preserves laminar flow therethrough and avoids a water hammer effect.

In accordance with one aspect of this invention, there is provided a variable orifice ball valve with an external housing having a first section and a second section. A longitudinal fluid bore is formed through the external housing. A seal is formed between the first and second housing sections, and a ball member is rotatably positioned within the external housing. The ball member includes a first manufactured ball portion and a second manufactured ball portion engageable with the first ball portion, and a longitudinal fluid bore formed through the ball member. A seal is again formed between the first and second ball portions. An elastically expansible sleeve member is secured at its end portions to an inner wall of the ball member. The middle section of the sleeve member is relatively thinner than the end portions. The elastically expansible sleeve member defines an expansible chamber between the inner wall of the ball member and the elastically expansible sleeve member. A valve stem extending from the ball member and through the external housing includes a valve stem port formed therethrough. Pressure can be supplied to the expansible chamber through the valve stem port to generate an infinite number of variable orifice sizes are formed in the fluid port.

BRIEF DESCRIPTION OF THE DRAWINGS

The appended claims particularly point out and distinctly claim the subject matter of this invention. The various objects, advantages and novel features of this invention will be more fully apparent from the reading of the following detailed description in conjunction with the accompanying drawings in which like reference numerals refer to like parts, and of which:

DESCRIPTION OF THE PREFERRED EMBODIMENT

Figure 3A:
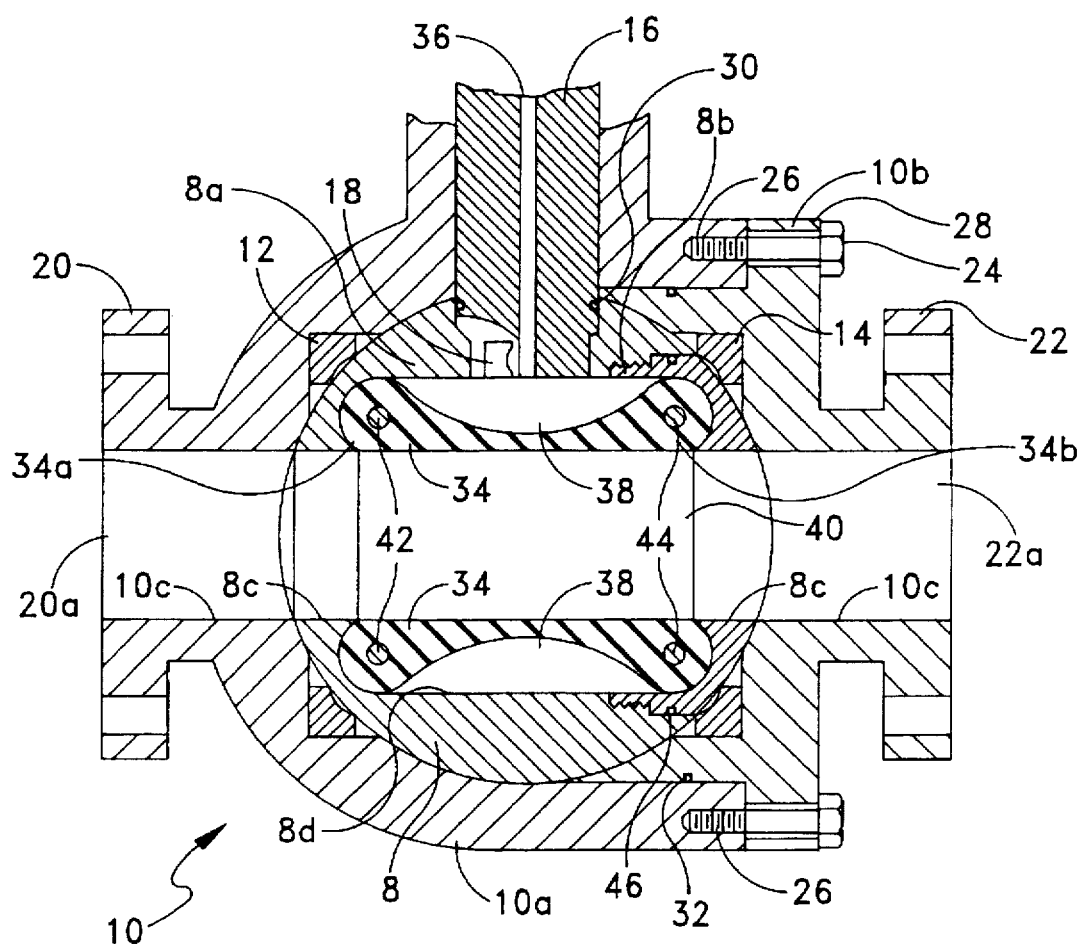
FIG. 3 is a cross-sectional side view of the variable orifice ball valve of the current invention split with the upper half showing the elastomer in its distended position and the lower half showing the elastomer in its relaxed position.
Figure 3B:
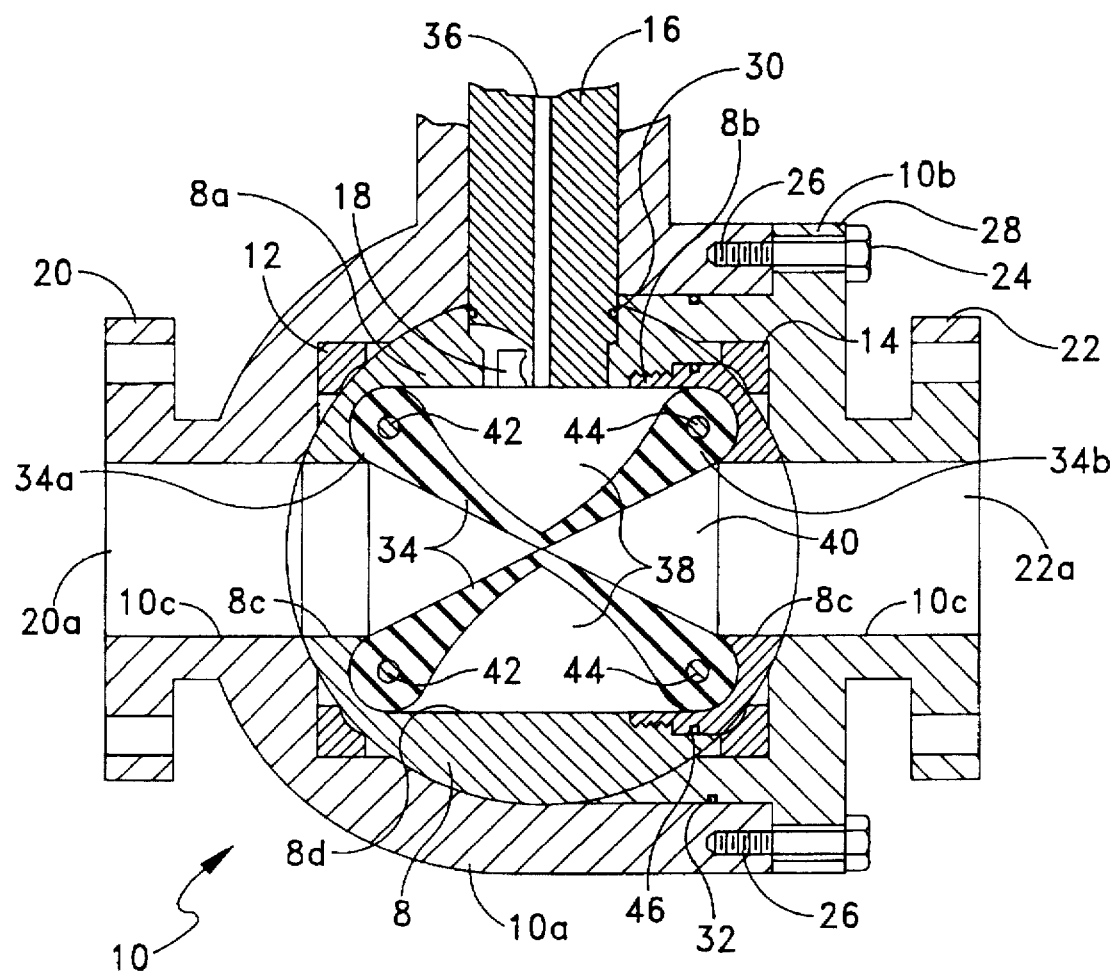

FIG. 3 illustrates the variable type orifice ball valve according to a preferred embodiment of the present invention. As shown particularly in FIG. 3, the variable orifice ball valve is shown generally at element 10.

The structure includes a ball member 8 which controls flow through the entirety of the ball valve device. The ball member 8 is positioned within an external housing which includes a first valve housing portion 10a and a second valve housing portion 10b, each valve housing portion including a flanged end 20 and 22, respectively. These opposing valve housing portions 10a and 10b are connected together by any suitable means such as bolts 24 fit within tap holes 26 formed through a flange portion 28 of the second valve housing 10b and into a mating portion of the first valve housing 10a. Outer flanged ends 20 and 22 of each of the first and second valve housings 10a, 10b include throughholes formed therethrough for connecting the entirety of the variable orifice ball valve 10 to an appropriate corresponding structure. Also formed within each of the first and second valve housings 10a and 10b are openings 20a and 22a, the openings 20a and 22a defining inlets and outlets, not necessarily respectively, of the variable orifice ball valve 10. The first and second valve housings 10a, 10b are sealed together in a fluid tight manner with an elastomeric seal 32 which is formed between coplanar mating surfaces of the first and second valve housings 10a, 10b.

The ball member 8, can be formed in two parts including portions 8a and 8b as shown. Although any suitable means of connection may be provided, these ball portions 8a and 8b are threadably connected together and a fluid tight seal is maintained therebetween by a ball seal O-ring 46. The inner wall surface of the ball 8 is formed generally with a fluid through-hole 8c formed across a diameter thereof. The through-hole is formed such that an annular recess 8d is formed therein.

Specifically, the cylindrical recess 8d formed within the ball member 8 includes an elastomeric member 34 of a substantially sleeved or cylindrical shape. The elastomeric member 34 is thicker at the outer ends 34a and 34b of the sleeve and thinner at a substantially intermediate portion of the sleeve as shown in FIG. 3. The outer ends of the sleeve shaped elastomeric member 34 are secured to the inner wall of the ball member. 8, and specifically within the recessed portion 8d of the ball member inner surface with a first ring 42 and a second ring 44. These rings 42 and 44 can be made from any rigid material such as a metallic material. The ring 42 is contained within end 34a of the elastomeric sleeve 34 while the second ring 44 is contained within an opposing end 34b of the elastomeric sleeve 34. These rings 42, 44 force the opposing ends of the elastomeric sleeve 34 into surface contact with the inner wall surface of the recessed portion 8d of the ball 8. In a relaxed or non-distended position, the elastomeric sleeve member 34 appears as shown at the lower portion of FIG. 3 and defines a fluid flow path substantially coplanar with the primary fluid flow path defined by the inner walls 10c of the outer housing 10a, 10b as they correspond to the primary flow path 8c of the ball member 8.

A valve stem actuator 16 is provided for conventionally rotating the ball 8 from a fully open position to a fully closed position by a 90° turn of the ball via the valve stem actuator 16. The valve stem actuator 16 is connected to the ball 8 in a conventional manner by a connection as reflected at area 18. In addition, the valve stem 16 is sealed at the base thereof by an O-ring 30 as shown. The valve stem 16 includes a port 36 longitudinally formed therethrough, preferably at its center line. The port 36 leads directly to a chamber 38 defined between a surface of the elastomeric sleeve member 34 and an inner surface of the ball member 8 as defined by the recessed portion 8d thereof. When the port 36 and the chamber 38 are not pressurized, the elastomeric sleeve member 34 is relaxed and configured as shown in the lower view of the assembly. In this condition, a fully opened port 40 is available for flow and the elastomeric sleeve member 34 is generally in a cylindrical configuration. However, if the chamber 38 is pressurized via the port 36, then the elastomeric member 34 will distort at its center to close down the port 40 as shown in the upper section of FIG. 3. The greater the pressure, the greater the deflection or distention until the port 40 is completely closed.

It should be noted that the center of the elastomeric sleeve member 34 is collapsible in lieu of the opposing ends due to two factors. One factor is that the center of the elastomeric sleeve 34 is thinner than opposing ends thereof and will therefore distort before the thicker section is distorted. In addition, the ends 34a, 34b of the elastomeric sleeve member 34 are manufactured with the reinforcing rings 42 and 44 as described, the reinforcing rings being molded into the ends 34a and 34b of the elastomeric sleeve member 34. These rings 42 and 44 prevent the ends of the elastomeric sleeve member 34 from collapsing and ensure that a seal is maintained between the elastomeric sleeve member 34 and the valve housings 10a and 10b so that pressure in the chamber 38 is maintained without leakage. By varying the pressure in the chamber 38, the extent of a flow restriction through port 40 can be continuously varied.

A feature of the assembly with respect to the ball portion is that the ball member 8 must be manufactured in two sections 8a and 8b as shown in order to facilitate installation of the elastomeric sleeve member 34. Once the elastomeric sleeve member 34 is installed within the sections 8a and 8b, the sections are joined together and their connection is sealed by the elastomeric seal 46 described above.

Figure 1:
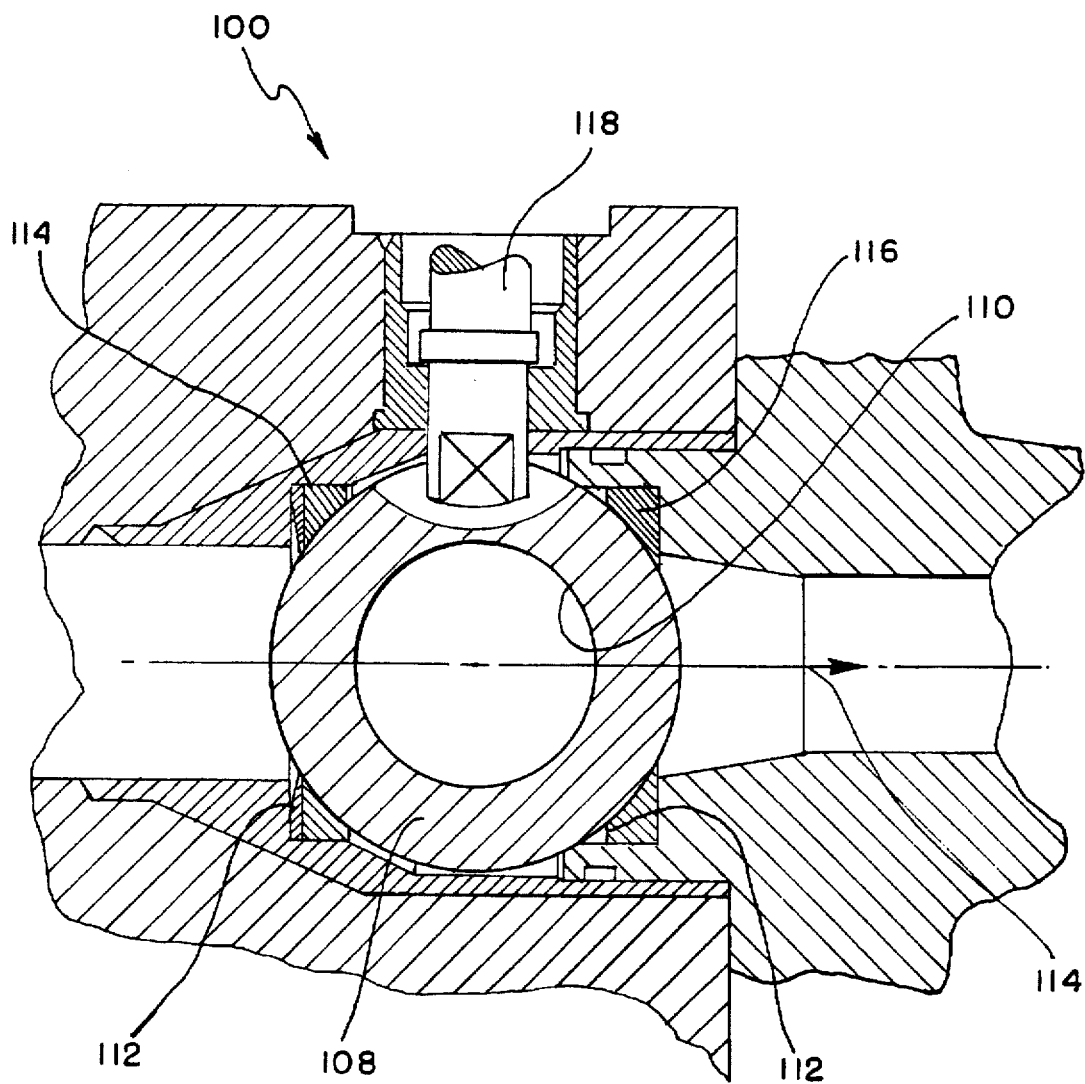
FIG. 1 is a cross-sectional side view of a prior art ball valve;.
Figure 2:
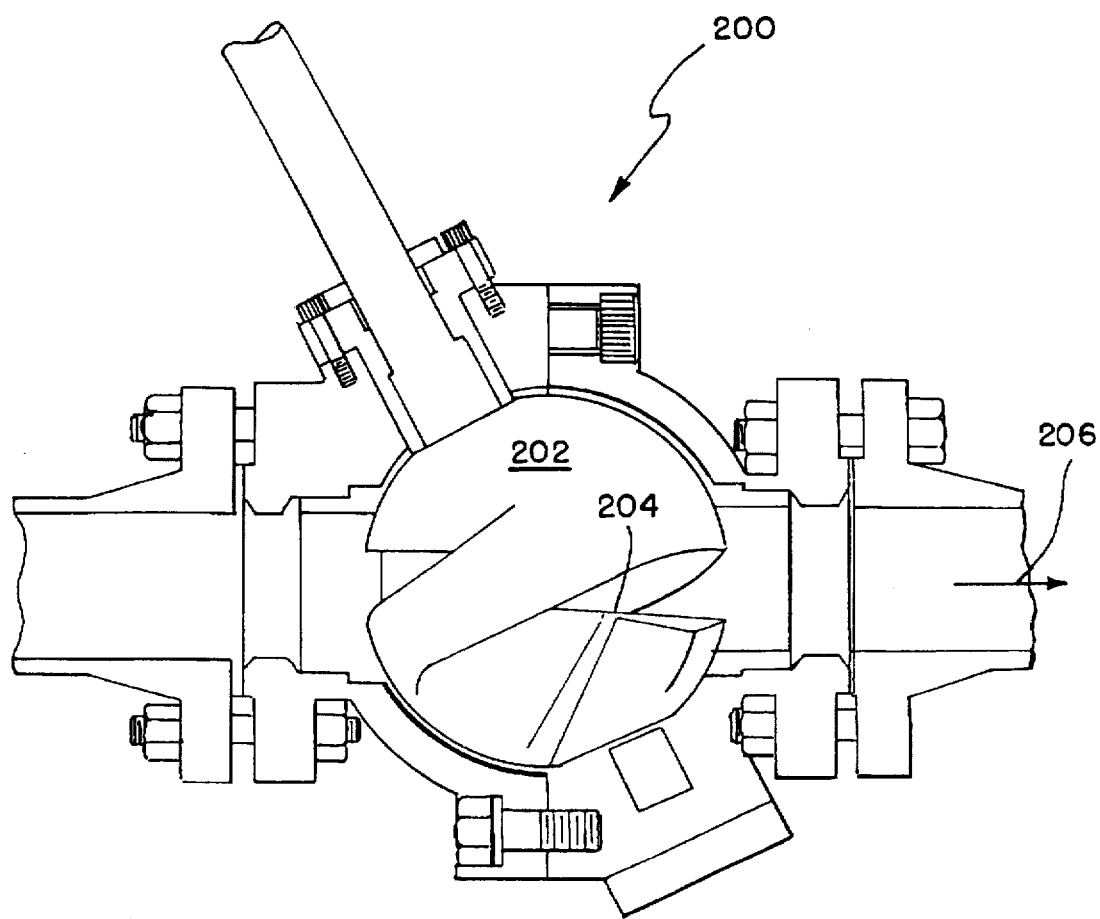
FIG. 2 is a partially cross-sectional side view of a prior art ball valve having a spiral groove cut into the ball.

In addition, in order to secure the positioning of the ball member. 8 within the external housings 10a and 10b, a first seal 12 and a second seal 14 are provided in surface contact with the external surface of the ball member 8 and the internal surface of the housing portions 10a and 10b. These seals 12 and 14 are similar to seals shown in the conventional art shown in FIG. 1 at 114 and 116.

An advantage of the present invention is its ability to introduce a flow restrictor into a piping system which provides a gradual flow restriction and relief to avoid introducing sharp edges into the flow field. A unique advantage results in the ability to provide fully variable flow restrictions. The valve does not require any more than a 90° turn from fully opened to fully closed positions and, therefore, does not require a custom actuator. The variable orifice ball valve disclosed has the capability to gradually open the flow path with any desired timing if the valve is rotated to the open position and then pressure used to block the piping flow is systematically released. Its size is relatively unchanged from a standard ball valve, and its cost is only marginally increased.

It should be understood that the sizes and shapes shown in the FIG. 3 are modifiable to suit design detail, testing and evaluation without detracting from the uniqueness of the design or the features thereof.

This invention has been disclosed in terms of certain embodiments. It will be apparent that many modifications can be made to the disclosed apparatus without departing from the invention. Therefore, it is the intent of the appended claims to cover all such variations and modifications as come within the true spirit of this invention.

What is claimed is:

1. A variable orifice ball valve comprising:

an external housing having a longitudinal fluid bore formed through the external housing;

a ball member rotatably positioned within said external housing having a longitudinal fluid bore formed through said ball member and defining an inner wall therethrough, said ball member having a pressure port formed therein in communication between an outer surface of said ball member and said ball member fluid bore;

an elastically expansible sleeve member secured to said inner wall of said ball member, said elastically expansible sleeve member including opposing end portions and a middle section, the middle section being relatively thinner than the opposing end portions, only the opposing end portions being secured to the inner wall of said ball member, said elastically expansible sleeve member further defining a variable sized fluid port on a surface of said elastically expansible sleeve member facing an interior of said ball member;

means for securing said elastically expansible sleeve member to the inner wall of said ball member, said elastically expansible sleeve member defining an expansible chamber at a location between the inner wall of said ball member and the elastically expansible sleeve member as defined by said means for securing; and a valve stem extending from said ball member and through said external housing, said valve stem including a valve stem port formed therethrough and positioned in communication with said pressure port for supplying pressurization to the expansible chamber.

2. The variable orifice ball valve according to claim 1 wherein said ball member is rotatable by up to 90 degrees within said housing, thereby selectively placing said fluid port into alignment with the longitudinal opening of said housing member.

3. The variable orifice ball valve according to claim 1 further comprising a pair of seal members positioned between said housing member and said ball member.

4. The variable orifice ball valve according to claim 1 wherein said external housing comprises:

a first external housing section;

a second external housing section connected with the first external housing section, the first and second external housing sections forming said external housing; and sealing means positioned between the first and second external housing sections.

5. The variable orifice ball valve according to claim 4 wherein said first and second external housing sections have corresponding holes therein and bolts passing through said holes and joining said first and second external housing sections.

6. The variable orifice ball valve according to claim 1 further comprising a seal member between said valve stem and said ball member.

7. The variable orifice ball valve according to claim 1 wherein the elastically expansible sleeve member distorts under pressurization at the center thereof to close down on the variable sized fluid port.

8. The variable orifice ball valve according to claim 1 wherein said ball member comprises:

a first ball portion;

a second ball portion engageable with the first ball portion, said first and second ball portions forming said ball member; and a ball portion sealing means positioned between the first and second ball portions.

9. The variable orifice ball valve according to claim 8 wherein said ball portion sealing means is an elastomeric material positioned at a joint of the first and second ball portions.

10. The variable orifice ball valve according to claim 8 wherein said ball portion sealing means is an elastomeric material positioned adjacent the outer peripheral surface of the ball member.

11. The variable orifice ball valve according to claim 8 wherein the first ball portion is threadably engageable with the second ball portion.

12. The variable orifice ball valve according to claim 1 wherein said means for securing includes a pair of rigid rings, one ring being formed within each end of said opposing end portions of said expansible sleeve member.

13. The variable orifice ball valve according to claim 1 wherein said valve stem port is formed along a longitudinal axis of said valve stem.

14. The variable orifice ball valve according to claim 1 wherein pressurization is supplied to said expansible chamber by providing a liquid thereto through said valve stem port.

15. The variable orifice ball valve according to claim 1 wherein pressurization is supplied to said expansible chamber by providing a gas thereto through said valve stem port.

16. The variable orifice ball valve according to claim 1 wherein an inner surface of said ball member includes a substantially cylindrical recess formed within the longitudinal fluid bore, such that ends of said elastically expansible sleeve member conform in outer surface shape to a corresponding surface on opposing walls of the substantially cylindrical recess.

17. The variable orifice ball valve according to claim 16 wherein the outer surface shape of said elastically expansible sleeve member narrows from a greater diameter at said opposing ends to a smaller diameter at said middle.

18. The variable orifice ball valve according to claim 16 wherein said elastically expansible sleeve member is cylindrical in shape.

19. The variable orifice ball valve according to claim 1 wherein said elastically expansible sleeve member is cylindrical in shape.

* * * * *